United States Patent
Ikarashi et al.

(10) Patent No.: US 10,885,814 B2
(45) Date of Patent: Jan. 5, 2021

(54) SHARE RECOVERY SYSTEM, SHARE RECOVERY APPARATUS, SHARE RECOVERY METHOD, AND PROGRAM

(71) Applicant: NIPPON TELEGRAPH AND TELEPHONE CORPORATION, Chiyoda-ku (JP)

(72) Inventors: Dai Ikarashi, Musashino (JP); Koji Chida, Musashino (JP); Ryo Kikuchi, Musashino (JP); Koki Hamada, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 300 days.

(21) Appl. No.: 15/557,585

(22) PCT Filed: Feb. 1, 2016

(86) PCT No.: PCT/JP2016/052944
§ 371 (c)(1),
(2) Date: Sep. 12, 2017

(87) PCT Pub. No.: WO2016/147718
PCT Pub. Date: Sep. 22, 2016

(65) Prior Publication Data
US 2018/0053442 A1    Feb. 22, 2018

(30) Foreign Application Priority Data
Mar. 18, 2015    (JP) ............................ 2015-054492

(51) Int. Cl.
*H04L 29/06*    (2006.01)
*G09C 1/00*    (2006.01)

(52) U.S. Cl.
CPC ...................................... *G09C 1/00* (2013.01)

(58) Field of Classification Search
CPC ..... G09C 1/00; H04L 9/085; H04L 2463/061; H04L 9/00; H04L 9/0819; H04N 21/26613
See application file for complete search history.

(56) References Cited

FOREIGN PATENT DOCUMENTS

| JP | 2004-341152 A | 12/2004 |
|---|---|---|
| JP | 4305049 B2 | 7/2009 |
| JP | 2014-138349 A | 7/2014 |

OTHER PUBLICATIONS

Tiina Turban—NPL May 2014 (Year: 2014).*
(Continued)

*Primary Examiner* — Tri M Tran
(74) *Attorney, Agent, or Firm* — Oblon, McClelland, Maier & Neustadt, L.L.P.

(57) ABSTRACT

An efficient share recovery technique for Shamir's secret sharing is provided. n share recovery apparatuses $p_0, \ldots, p_{n-1}$ generate a share $[r]_i$ of a secretly shared value shared through Shamir's secret sharing, which becomes a random number $r$ when restored. k share recovery apparatuses $\sigma_0, \ldots, \sigma_{k-1}$ calculate a share $[b]_i$ by subtracting the share $[r]_i$ from a share $[a]_i$. The share recovery apparatus $\tau_k$ receives the shares $[b]_0, \ldots, [b]_{k-1}$ from the share recovery apparatuses $\sigma_0, \ldots, \sigma_{k-1}$. The share recovery apparatus $\tau_k$ recovers shares $[b]_k, \ldots, [b]_{k+m-1}$ using the shares $[b]_0, \ldots, [b]_{k-1}$. m−1 share recovery apparatuses $\tau_{k+1}, \ldots, \tau_{k+m-1}$ receive a share $[b]_j$ from the share recovery apparatus $\tau_k$. m share recovery apparatuses $\tau_k, \ldots, \tau_{k+m-1}$ calculate the share $[a]_j$ by adding the share $[r]_j$ to the share $[b]_j$.

5 Claims, 7 Drawing Sheets

(56) References Cited

OTHER PUBLICATIONS

Michael Mortensen—NPL 2007 (Year: 2007).*
International Search Report dated Apr. 26, 2016 in PCT/JP2016/052944 filed Feb. 1, 2016.
Notification of Reasons for Refusal dated Apr. 26, 2016 in Japanese Patent Application No. 2015-054492 (with English language translation).
Dai Ikarashi, et al., "O(I) Bits Communication Bit Decomposition and O(lp'l) Bits Communication Modulus Conversion for Small k Secret-sharing-based Secure Computation" Computer Security Symposium 2013, Oct. 2013, pp. 785-792.
Tiina Turban, "A Secure Multi-Party Computation Protocol Suite Inspired by Shamir's Secret Sharing Scheme" Norwegian University of Science and Technology, 2014, 35 Pages.
K. V. Rashmi, et al., "Optimal Exact-Regenerating Codes for Distributed Storage at the MSR and MBR Points via a Product-Matrix Construction" CoRR, arXiv:1005.4178v2, Jan. 20, 2011, 20 Pages.
Adi Shamir, "How to Share a Secret" Communications of the ACM, vol. 22, No. 11, Nov. 1979, pp. 612-613.
Office Action dated Jun. 1, 2020 in Chinese Application No. 201680015306.1.

* cited by examiner

SHARE RECOVERY SYSTEM, SHARE RECOVERY APPARATUS, SHARE RECOVERY METHOD, AND PROGRAM

TECHNICAL FIELD

The present invention relates to a secret sharing technique, and, more particularly, to a technique of, in the case where part of shares among secretly shared values is lost, recovering the lost shares.

BACKGROUND ART

Secret sharing is a technique of converting data into a plurality of divided shared values and making it possible to restore original data by using a certain number or more shares and making it never possible to restore original data with less than the certain number of shares. It should be noted that a set of a plurality of secretly shared values is referred to as a shared value, and one piece among the shared values is referred to as a share. Examples of secret sharing include Shamir's secret sharing, replicated secret sharing, and the like.

Recovery is a method of reconstructing part of shares which cannot be utilized when part of shares is lost as a result of a party holding the shares being unable to be utilized, or the like, from a certain number of shares which can be utilized, without losing concealability. As a conventional art of recovery, for example, there are methods disclosed in Patent literature 1 and Non-patent literature 1.

PRIOR ART LITERATURE

Patent Literature

Patent literature 1: Japanese Registered Patent No. 4305049

Non-Patent Literature

Non-patent literature 1: K. V. Rashmi, N. B. Shah, and P. V. Kumar, "Optimal Exact-Regenerating Codes for Distributed Storage at the MSR and MBR Points via a Product-Matrix Construction", CoRR, vol. abs/1005.4178, 2010.

SUMMARY OF THE INVENTION

Problems to be Solved by the Invention

The conventional arts disclosed in Patent literature 1 and Non-patent literature 1 require dedicated coding. Therefore, the conventional arts cannot be applied to secret computation unlike with Shamir's secret sharing, or the like. Further, an average communication volume per party in the method of Patent literature 1 is O(n), and the method is low in efficiency.

In view of such circumstances, it is an object of the present invention to provide an efficient share recovery technique for Shamir's secret sharing.

Means to Solve the Problems

To solve the above-described problem, a share recovery system of the present invention is a share recovery system including n share recovery apparatuses $p_0, \ldots, p_{n-1}$, in which $n \geq 2k-1$, $m \leq n-k$, i is an integer equal to or greater than 0 and less than k, j is an integer equal to or greater than k+1 and less than k+m, $[a]_0, \ldots, [a]_{n-1}$ are shares obtained by dividing information a into n pieces by Shamir's secret sharing, $\sigma_0, \ldots, \sigma_{k-1}$ are k share recovery apparatuses holding valid shares $[a]_0, \ldots, [a]_{k-1}, \tau_k, \ldots \tau_{k+m-1}$ are m share recovery apparatuses holding invalid shares $[a]_k, \ldots, [a]_{k+m-1}$, the share recovery apparatus $\sigma_i$ includes a random number generating part configured to generate a share $[r]_i$ of a secretly shared value $[r]$ shared through Shamir's secret sharing, which becomes a random number r when restored, and a concealing part configured to calculate a share $[b]_i$ of a secretly shared value $[b]$ shared through Shamir's secret sharing, which becomes a value b when restored by subtracting the share $[r]_i$ from the share $[a]_i$, the share recovery apparatus $\tau_k$ includes a random number generating part configured to generate a share $[r]_k$ of the secretly shared value $[r]$ shared through Shamir's secret sharing, a share communication part configured to receive shares $[b]_0, \ldots, [b]_{k-1}$ of the secretly shared value $[b]$ shared through Shamir's secret sharing from the share recovery apparatuses $\sigma_0, \ldots, \sigma_{k-1}$, a recovery part configured to recover the shares $[b]_k, \ldots, [b]_{k+m-1}$ of the secretly shared value $[b]$ shared through Shamir's secret sharing using the shares $[b]_0, \ldots, [b]_{k-1}$, and a restoring part configured to calculate a share $[a]_k$ by adding a share $[r]_k$ to the share $[b]_k$, and the share recovery apparatus $\tau_j$ includes a random number generating part configured to generate a share $[r]_j$ of the secretly shared value $[r]$ shared through Shamir's secret sharing, a share communication part configured to receive a share $[b]_j$ of the secretly shared value $[b]$ shared through Shamir's secret sharing from the share recovery apparatus $\tau_k$, and a restoring part configured to calculate a share $[a]_j$ by adding a share $[r]_j$ to the share $[b]_j$.

Effects of the Invention

In the share recovery technique of the present invention, a party average communication volume when shares of Shamir's secret sharing are recovered is one field element. Further, even in the case where a plurality of shares are lost, the average communication volume does not change. Therefore, according to the present invention, it is possible to efficiently recover shares of Shamir's secret sharing.

DETAILED DESCRIPTION OF THE EMBODIMENTS

Figure 1:
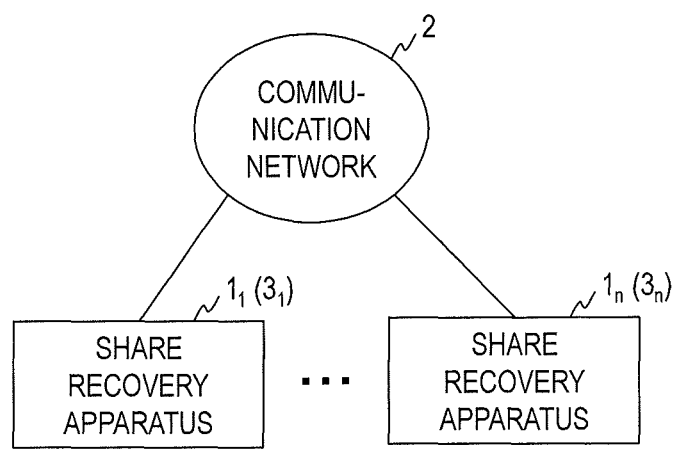
FIG. 1 is a diagram illustrating a functional configuration of a share recovery system.

Before description of embodiments, notation in the present specification and a basic idea of the present invention will be described.

[Notation]

p_i indicates a party which holds the i-th share.

$p=(p_0, \ldots, p_{n-1})$ indicates a set of the whole n parties which hold shares.

$\sigma_i \in P$ indicates a party which holds a valid share and which is operating.

$\tau_i \in P$ indicates a party which loses a valid share and which fails to operate.

$[\blacksquare]^x$ (square bracket) indicates a shared value of plain text ■ shared through Shamir's secret sharing. x indicates an element count in plain text space. x=p can be indicated as [■] by omitting x. p is a prime number which is an order of a group $Z_p$.

$[\blacksquare]_i$ indicates a share held by a party $p_i \in P$ among secretly shared values [■] shared through Shamir's secret sharing.

[Shamir's Secret Sharing]

Shamir's secret sharing is one of (k, n)-secret sharing. (k, n)-secret sharing is secret sharing in which shared values obtained by dividing input plain text into n pieces are held while shared in n parties, the plain text can be restored if arbitrary k shares are collected, and no information regarding the plain text can be obtained from less than k shares. At this time, n and k are integers equal to or greater than 1, and n=2k−1. See the following reference literature for details of Shamir's secret sharing.

[Reference literature 1] A. Shamir, "How to share a secret", Communications of the ACM, vol. 22(11), pp. 612-613, 1979.

In Shamir's secret sharing, a coordinate $x_i$ is assigned to the i-th party $p_i$, and information a is shared with the following formula using a random number $r_i$.

$$[a]_i = a + \sum_{1 \le i < k-1} r_i x^i \qquad \text{[Formula 1]}$$

An advantage of Shamir's secret sharing is that a data volume is small. On the other hand, a disadvantage is that the number of elements of a field has to be equal to or greater than n+1, and mod 2 cannot be used.

Details of the embodiments of the present invention will be described below. It should be noted that the same reference numerals are assigned to components having the same functions in the drawing, and overlapped description will be omitted.

First Embodiment

A share recovery system according to the first embodiment includes n (≥3) share recovery apparatuses $1_1, \ldots, 1_n$ as illustrated in FIG. 1. In the present embodiment, the share recovery apparatuses $1_1, \ldots, 1_n$ are respectively connected to a communication network 2. The communication network 2 is a communication network in a circuit switching scheme or in a packet switching scheme configured so that the connected apparatuses can perform communication with each other, and, for example, the Internet, a LAN (Local Area Network), a WAN (Wide Area Network), or the like, can be used. It should be noted that each apparatus does not always have to perform communication online via the communication network 2. For example, it is also possible to employ a configuration where information to be input to the share recovery apparatus $1_i$ ($i \in \{1, \ldots, n\}$) is stored in a portable recording medium such as a magnetic tape and a USB memory and input offline from the portable recording medium.

Figure 2:
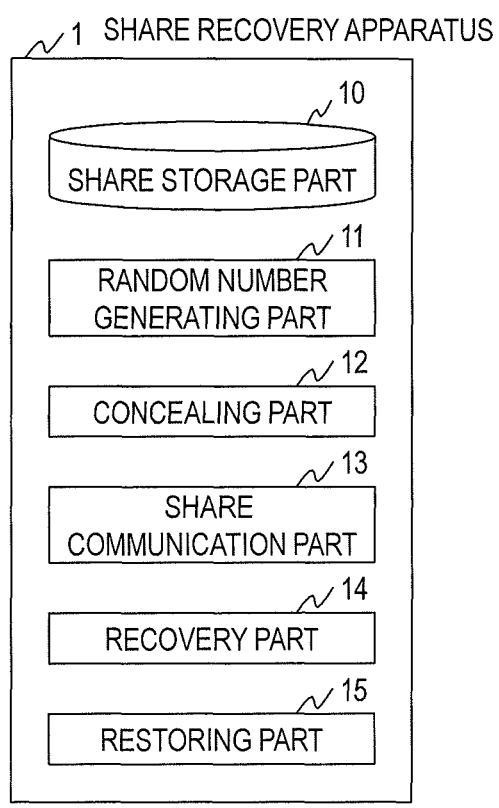
FIG. 2 is a diagram illustrating a functional configuration of a share recovery apparatus according to a first embodiment.

As illustrated in FIG. 2, the share recovery apparatus 1 includes a share storage part 10, a random number generating part 11, a concealing part 12, a share communication part 13, a recovery part 14 and a restoring part 15.

The share recovery apparatus 1 is, for example, a special apparatus configured by a special program being loaded in a publicly known or dedicated computer having a central processing unit (CPU: Central Processing Unit), a main memory (RAM: Random Access Memory), or the like. The share recovery apparatus 1, for example, executes each processing under control of the central processing unit. Data input to the share recovery apparatus 1 and data obtained through each processing are, for example, stored in the main memory, and the data stored in the main memory is read out to the central processing unit as necessary to be utilized for other processing. At least part of processing parts of the share recovery apparatus 1 may be configured with hardware such as an integrated circuit.

The share storage part 10 of the share recovery apparatus 1 can be configured with, for example, a main memory such as a RAM (Random Access Memory), an auxiliary storage configured with a hard disk, an optical disk, or a semiconductor memory device such as a flash memory, or a middleware such as a relational database and a key-value store.

Figure 3:
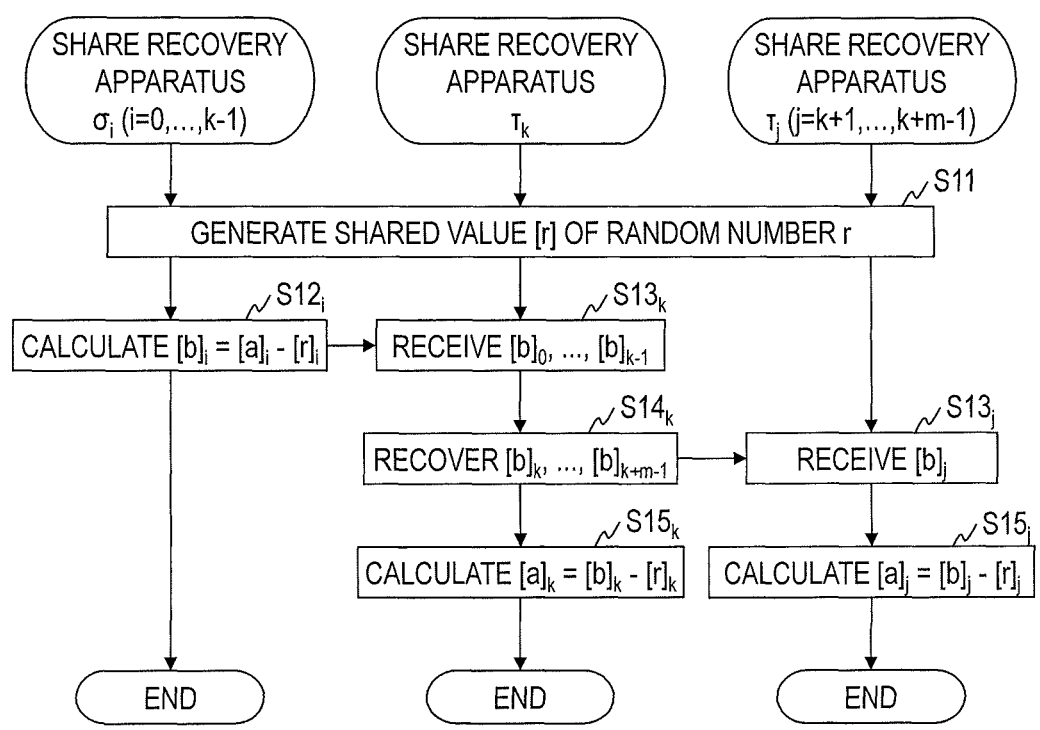
FIG. 3 is a diagram illustrating processing flow of a share recovery method according to the first embodiment.

Processing procedure of a share recovery method according to the first embodiment will be described with reference to FIG. 3.

In the following description, it is assumed that $\sigma_0, \ldots, \sigma_{k-1}$ are k share recovery apparatuses arbitrarily selected from share recovery apparatuses which are operating, and $\tau_k, \ldots, \tau_{k+m-1}$ (m≤n−k) are m share recovery apparatuses which fail to operate. That is, among secretly shared values [a] shared through Shamir's secret sharing of information a, shares $[a]_0, \ldots, [a]_{k-1}$ are valid shares, and $[a]_k, \ldots, [a]_{k+m-1}$ are corrupted or lost shares. $\sigma_0, \ldots, \sigma_{k-1}$ and $\tau_k, \ldots, \tau_{k+m-1}$ are signs logically indicating roles of the share recovery apparatuses, and which share recovery apparatuses $1_1, \ldots, 1_n$ correspond to which share recovery apparatuses $\sigma_0, \ldots, \sigma_{k-1}$ and $\tau_k, \ldots, \tau_{k+m-1}$ is arbitrarily determined upon execution.

In the share storage parts 10 of at least k share recovery apparatuses $\sigma_i$ (i=0, . . . , k−1), the i-th share $[a]_i$ among shared values [a] obtained by dividing information a into n pieces through Shamir's secret sharing is stored. The information a is an element of a field F, and the field F is a set of numbers of mod p. It should be noted that p is a prime number.

In step S11, the random number generating parts 11 of n share recovery apparatuses $p_i$ (i=0, . . . , n−1) generate a share $[r]_i$ of a secretly shared value [r] shared through Shamir's secret sharing, which becomes a random number r when restored. The share $[r]_i$ is transmitted to the concealing part 12 and the restoring part 15. The share $[r]_i$ has to be generated in a state where the random number r is kept secret from all the share recovery apparatuses $p_i$. For example, the share $[r]_i$ can be generated as follows. First, each of the share recovery apparatuses $p_j$ (j=0, . . . , n−1) generates a random number $r_j$. Then, each of the share recovery apparatus $p_j$ divides the random number $r_j$ through Shamir's secret sharing to generate a shared value $[r_j]$ of the random number $r_j$. Each of the share recovery apparatuses $p_i$ (i=0, . . . , n−1) calculates $[r]_i = \sigma_{j<n}[r_j]_i$, to obtain a share $[r]_i$ of the random number r. According to such a configuration, it is possible to obtain the share $[r]_i$ of the random number r while none of the share recovery apparatuses $p_0, \ldots, p_{n-1}$ knows the random number r.

In step S12$_i$, the concealing parts 12 of k share recovery apparatuses σ$_i$ (i=0, . . . , k−1) calculate a share [b]$_i$ of Shamir's secret sharing by subtracting the share [r]$_i$ output from the random number generating part 11 from the share [a]$_i$ stored in the share storage part 10. That is, [b]$_i$=[a]$_i$−[r]$_i$ is calculated. The share communication part 13 of the share recovery apparatus σ$_i$ transmits the share [b]$_i$ to the share recovery apparatus τ$_k$. In step S13$_k$, the share communication part 13 of the share recovery apparatus τ$_k$ receives k shares [b]$_0$, . . . , [b]$_{k-1}$ from the share recovery apparatuses σ$_0$, . . . , σ$_{k-1}$.

In step S14$_k$, the recovery part 14 of the share recovery apparatus τ$_k$ recovers m shares [b]$_k$, . . . , [b]$_{k+m-1}$ using k shares [b]$_0$, . . . , [b]$_{k-1}$ received from the share recovery apparatuses σ$_0$, . . . , σ$_{k-1}$. The share communication part 13 of the share recovery apparatus τ$_k$ transmits m−1 shares [b]$_j$ (j=k+1, . . . , k+m−1) to the share recovery apparatus τ$_j$. In step S13$_j$, the share communication part 13 of the share recovery apparatus τ$_j$=k+1, k+m−1) receives a share [b]$_j$ from the share recovery apparatus τ$_k$.

The recovery part 14 of the share recovery apparatus τ$_k$ specifically recovers a share as follows. The recovery part 14 calculates the share [b]$_1$ using the following formula for j=k, k+m−1.

$$[b]_j := \sum_{i<k} \lambda_{\sigma,i,j}[b]_i \quad \text{[Formula 2]}$$

Here, λσ$_{,i,j}$ is a coefficient to be multiplied by a function value f(x$_i$) when a function value f(x$_j$) of a coordinate x$_j$ is calculated from function values f(x$_0$), . . . , f(x$_{k-1}$) (=[a]$_0$, . . . , [a]$_{k-1}$) of coordinates x$_0$, . . . , x$_{k-1}$ in publicly known Lagrange interpolation. λσ$_{,i,j}$ can be calculated using the following formula.

$$\lambda_{\sigma,i,j} = \prod_{l<k} \frac{x_j - x_l}{x_i - x_l} \quad \text{[Formula 3]}$$

In step S15$_k$, the restoring part 15 of the share recovery apparatus τ$_k$ calculates a share [a]$_k$ by adding the share [r]$_k$ output from the random number generating part 11 to the share [b]$_k$ output by the recovery part 14. That is, [a]$_k$=[b]$_k$+[r]$_k$ is calculated. In a similar manner, in step S15$_j$, the restoring parts 15 of m−1 share recovery apparatuses τ$_j$ (j=k+1, k+m−1) calculate a share [a]$_j$ by adding the share [r]$_j$ output from the random number generating part 11 to the share [b]$_j$ received from the share recovery apparatus τ$_k$. That is, [a]$_j$=[b]$_j$+[r]$_j$ is calculated.

While, in the share recovery system and method according to the present embodiment, a random number r is used during processing, because this random number r is cancelled in the end, it is not necessary to generate a share of an operating party again when the share is recovered. Further, because the recovered share is identical with the share before being lost, data version management does not degrade.

Performance of the share recovery system and method according to the present embodiment is as follows. The communication volume is the number of bits calculated using the following formula, where m is the number of lost shares, and |p| is the number of bits required for expressing a prime number p.

$$\left(k + m + \frac{n(n-1)}{n-k+1}\right)|p| \quad \text{[Formula 4]}$$

The total number of rounds is two. The generation amount of the random number is the number of bits calculated using the following formula.

$$\frac{n(k-1)}{n-k+1}|p| \quad \text{[Formula 5]}$$

Second Embodiment

A share recovery system according to the second embodiment includes n (≥3) share recovery apparatuses 3$_1$, . . . , 3$_n$ as illustrated in FIG. 1.

Figure 4:
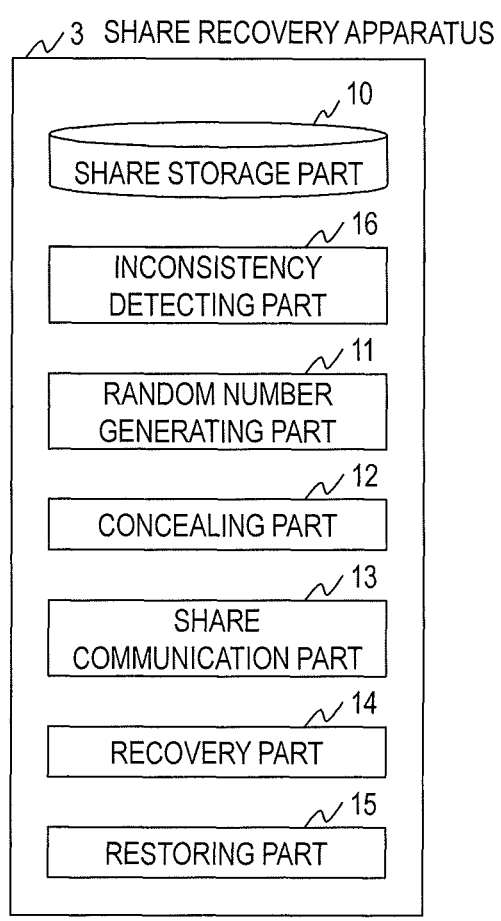
FIG. 4 is a diagram illustrating a functional configuration of a share recovery apparatus according to a second embodiment.
Figure 5:
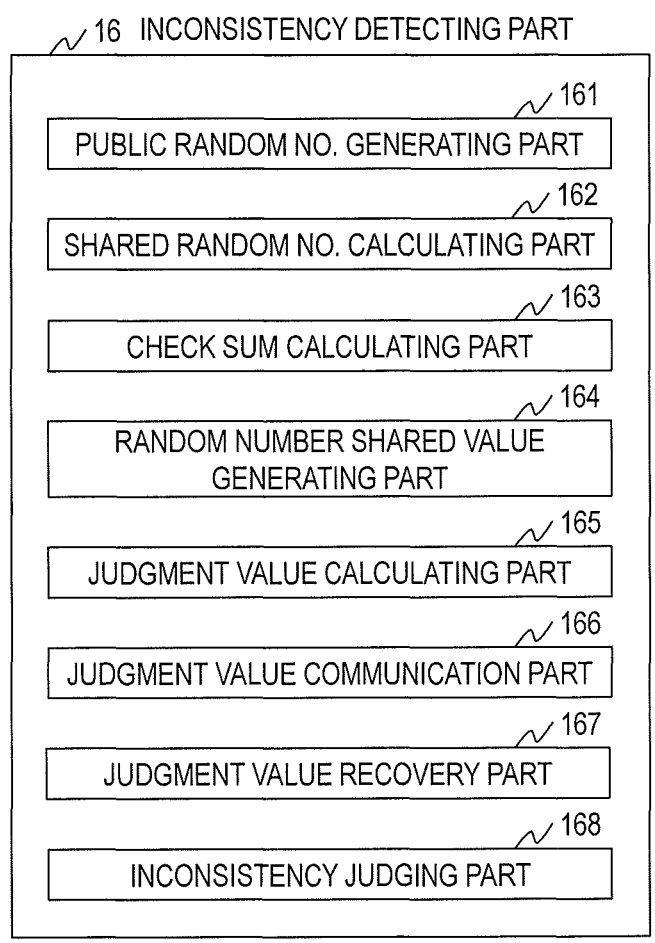
FIG. 5 is a diagram illustrating a functional configuration of an inconsistency detecting part.

As illustrated in FIG. 4, the share recovery apparatus 3$_i$ (i=1, . . . , n) includes the share storage part 10, the random number generating part 11, the concealing part 12, the share communication part 13, the recovery part 14 and the restoring part 15 in a similar manner to the first embodiment, and further includes an inconsistency detecting part 16. As illustrated in FIG. 5, the inconsistency detecting part 16 includes a public random number generating part 161, a shared random number calculating part 162, a check sum calculating part 163, a random number shared value generating part 164, a judgment value calculating part 165, a judgment value communication part 166, a judgment value recovery part 167 and an inconsistency judging part 168.

Figure 6:
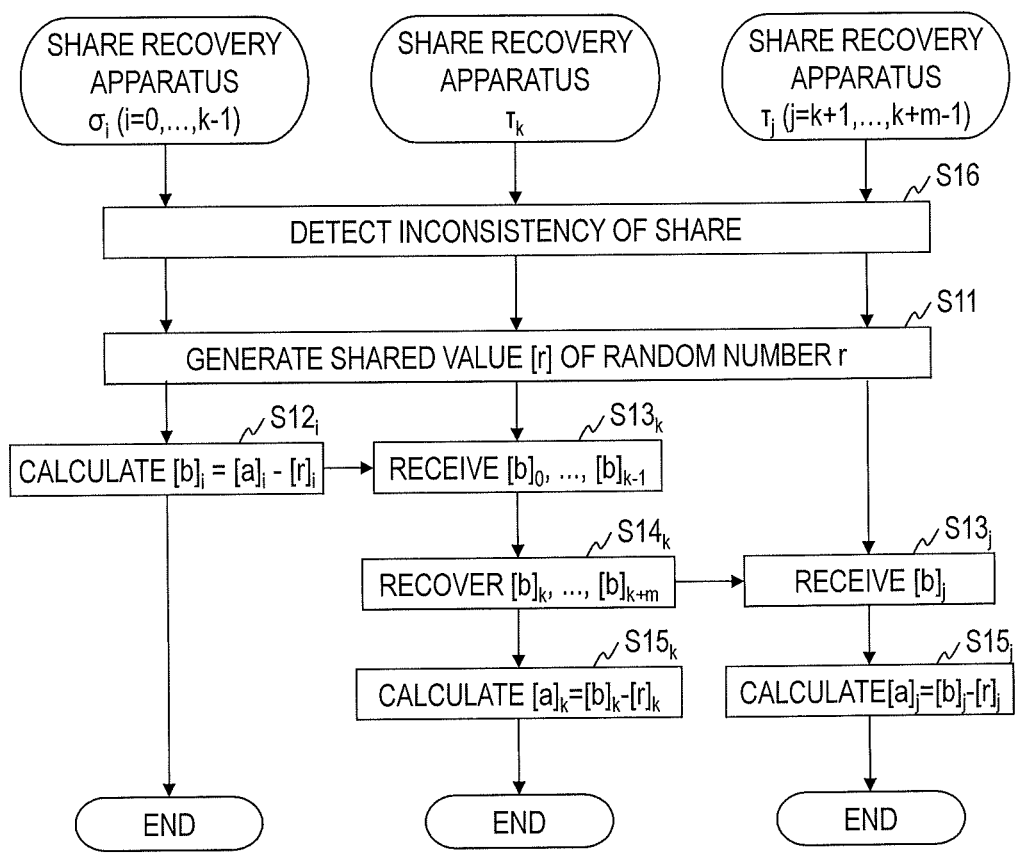
FIG. 6 is a diagram illustrating processing flow of a share recovery method according to the second embodiment.

Processing procedure of the share recovery method according to the second embodiment, mainly a difference with the processing procedure according to the first embodiment, will be described with reference to FIG. 6.

In step S16, the inconsistency detecting parts 16 of n share recovery apparatuses p$_i$ (i=0, . . . , n−1) verify whether or not there is inconsistency in a shared value [a] of information a stored in the share storage part 10 and specify share recovery apparatuses τ$_k$, . . . , τ$_{k+m-1}$ having invalid shares. Further, at the same time, the inconsistency detecting parts 16 select k share recovery apparatuses σ$_0$, . . . , σ$_{k-1}$ which are to recover shares among share recovery apparatuses having valid shares.

In processing after step S11, the share recovery apparatuses τ$_k$, . . . , τ$_{k+m-1}$ having invalid shares and k share recovery apparatuses σ$_0$, . . . , σ$_{k-1}$ selected from n−m share recovery apparatuses having valid shares recover invalid shares using the method described in the first embodiment.

Figure 7:
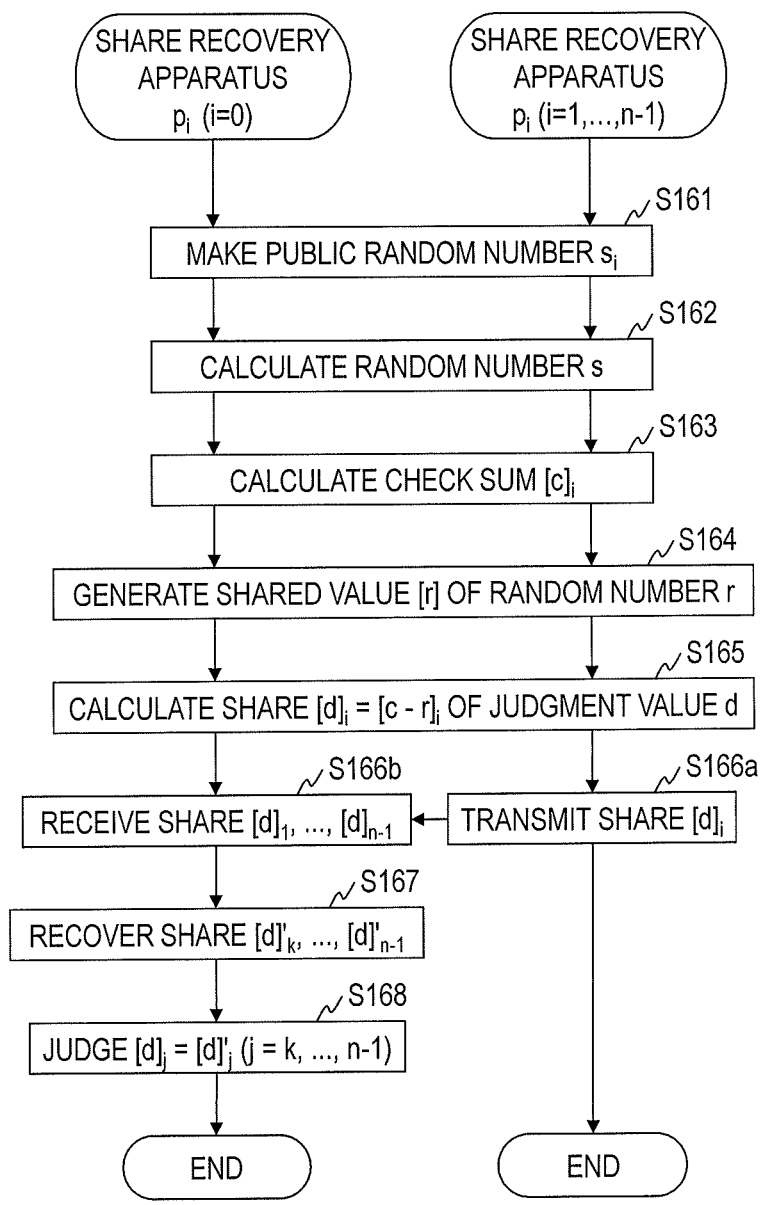
FIG. 7 is a diagram illustrating processing flow of an inconsistency detecting method.

Processing procedure for detecting inconsistency of shared values by the inconsistency detecting part 16 will be described in more details with reference to FIG. 7.

In step S161, the public random number generating parts 161 of n share recovery apparatuses p$_i$ (i=0, . . . , n−1) generate a random number s$_i$. The generated random number s$_i$ is opened to the public so as to be referred to from other n−1 share recovery apparatuses p$_{i'}$ (i'=0, . . . , n−1, i≠i').

In step S162, the shared random number calculating parts 162 of n share recovery apparatuses p$_i$ calculate a shared random number s using the following formula using n random numbers s$_0$, . . . , s$_{n-1}$ which are combination of random numbers s$_i$ generated by the share recovery apparatuses p$_i$ and random numbers s$_{i'}$ opened to the public by other n−1 share recovery apparatuses p$_{i'}$.

$$s := \tau_{i<n} s_i \quad \text{[Formula 6]}$$

In step S163, the check sum calculating parts 163 of n share recovery apparatuses $p_i$ calculate a check sum $[c]_i$ using the following formula using the shared random number s calculated by the shared random number calculating part 162 assuming that the share $[a]_i$ stored in the share storage part 10 is $[a]_i:=[a_0]_i, \ldots, [a_{m-1}]_i$).

$$[c]_i := \Sigma_{j<m-1} s^{j+1}[a_j]_i + s^{m+1}[a_{m-1}]_i \quad \text{[Formula 7]}$$

In step S164, the random number shared value generating parts 164 of n share recovery apparatuses $p_i$ generate a share $[r']_i$ of a secretly shared value $[r']$ shared through Shamir's secret sharing, which becomes a random number r' when restored. As a method for generating the share $[r']_i$, it is only necessary to perform similar processing to that performed by the above-described random number generating part 11.

In step S165, the judgment value calculating parts 165 of the n share recovery apparatuses $p_i$ calculate a share $[d]_i = [c-r']_i$ of a secretly shared value [d] shared through Shamir's secret sharing, which becomes a judgment value d when restored by subtracting the share $[r']_i$ generated by the random number shared value generating part 164 from the check sum $[c]_i$ calculated by the check sum calculating part 163. Subtraction between shares can be performed without communication being performed between the share recovery apparatuses $p_0, \ldots, p_{n-1}$.

In step S166a, the judgment value communication parts 166 of n−1 share recovery apparatuses $p_1, \ldots, p_{n-1}$ transmit the share $[d]_i$ calculated by the judgment value calculating part 165 to the share recovery apparatus $p_0$. In step S166b, the judgment value communication part 166 of the share recovery apparatus $p_0$ receives n−1 shares $[d]_1, \ldots, [d]_{n-1}$ from n−1 share recovery apparatuses $p_1, \ldots, p_{n-1}$.

In step S167, the judgment value recovery parts 167 of n share recovery apparatuses $p_i$ recover n−k shares $[d]'_k, \ldots, [d]'_{n-1}$ from k shares $[d]_0, \ldots [d]_{k-1}$. The shares can be recovered using Lagrange interpolation in a similar manner to the above-described recovery part 14.

In step S168, the inconsistency judging parts 168 of n share recovery apparatuses $p_i$ judge whether or not the share $[d]_{j'}$ received from the share recovery apparatus $p_{j'}$ matches the recovered share $[d]_{j'}$ for j'=k, ..., n−1. If $[d]_{j'}=[d]'_{j'}$ holds for all j'=k, ..., n−1, it is judged that there is no inconsistency, while $[d]_{j'}\neq[d]'_{j'}$ for any of j', it is judged that there is inconsistency. In the case where it is judged that there is no inconsistency, information indicating that there is no inconsistency (such as, for example, a judgment value d restored from k shares $[d]_0, \ldots, [d]_{k-1}$) is output, and processing is finished.

In the case where it is judged that there is inconsistency, 2k−1 share recovery apparatuses are selected among n share recovery apparatuses $p_i$, and inconsistency detection is repeated through processing procedure by the above-described inconsistency detecting part 16 for all combinations of 2k−1 share recovery apparatuses. By this means, it is possible to detect that a share held by the share recovery apparatus which performs processing in all the cases where inconsistency is detected is an invalid share.

According to the share recovery system and method according to the second embodiment, it is possible to recover a share even if all the share recovery apparatuses are operating, such as in the case where bits of a share are incidentally inverted and in the case where a share is falsified by an attacker. Particularly, while it is impossible to address an attack such as falsification of both a share itself and a hash value with a method of detecting falsification by calculating the hash value of the share itself, the method according to the present embodiment is effective because inconsistency can be detected unless all shares are falsified so as to make sense. Further, processing of the inconsistency detecting part is efficient because the communication volume is O(1) and the round number is O(1) regardless of a data volume of the share.

The present invention is not limited to the above-described embodiments, and it goes without saying that the present invention can be changed as appropriate within a range not deviating from the gist of the present invention. Various kinds of processing described in the above-described embodiments may be executed in parallel or individually according to processing capacity of an apparatus which executes the processing or as necessary in addition to being executed in time series according to the described order.

[Program, Recording Medium]

In the case where various kinds of processing functions in each apparatus described in the above-described embodiments are implemented with a computer, processing content of functions which each apparatus should have is described by a program. By this program being executed at the computer, various kinds of processing functions at each apparatus are implemented on the computer.

The program describing this processing content can be recorded in a computer readable recording medium. As the computer readable recording medium, any recording medium, for example, a magnetic recording apparatus, an optical disk, a magnetooptical recording medium, a semiconductor memory, or the like, can be used.

Further, this program is distributed by, for example, selling, transferring, lending, or the like, a portable recording medium such as a DVD and a CD-ROM in which the program is recorded. Still further, it is also possible to employ a configuration where this program is stored in a storage apparatus of a server computer, and the program is distributed by transferring the program from the server computer to other computers via a network.

A computer which executes such a program, for example, first, stores a program recorded in a portable recording medium or a program transferred from a server computer in a storage apparatus of the computer once. Then, upon execution of processing, this computer reads out the program stored in the recording medium of the computer and executes processing according to the read program. Further, as another execution form of this program, the computer may read out the program directly from the portable recording medium and execute processing according to the program, or, every time a program is transferred from a server computer to the computer, may sequentially execute processing according to the received program. Further, it is also possible to employ a configuration where the above-described processing is executed by, so-called ASP (Application Service Provider) type service, which implements processing function only with an execution instruction and acquisition of the result without the program being transferred from the server computer to the computer. It should be noted that the program in the present embodiment includes information equivalent to a program which is provided to be used for processing by an electronic computer (such as data which is not a direct command for the computer, but has property of specifying processing of the computer).

Further, while, in the present embodiment, the apparatus is configured by a predetermined program being executed on a computer, at least part of the processing content may be implemented with hardware.

What is claimed is:

1. A share recovery system including n share recovery apparatuses $p_0, \ldots, p_{n-1}$ that recovers m invalid shares $[a]_k, \ldots, [a]_{k+m-1}$ usking k valid shares $[a]_0, \ldots, [a]_{k-1}$ without updating k valid shares $[a]_0, \ldots, [a]_{k-1}$, in which $n \geq 2k-1$, $m \leq n-k$, i is an integer equal to or greater than 0 and less than k, j is an integer equal to k+1 and less than k+m, $[a]_0, \ldots, [a]_{n-1}$ are shares obtained by dividing information a into n pieces through Shamir's secret sharing, $\sigma_0, \ldots, \sigma_{k-1}$ are k share recovery apparatuses holding valid shares $[a]_0, \ldots, [a]_{k-1}$, and $\tau_k, \ldots, \tau_{k+m-1}$ are m share recovery apparatuses holding invalid shares $[a]_k, \ldots, [a]_{k+m-1}$, the share recovery apparatus $\sigma_i$ includes:

first circuitry configured to:

generate a share $[r]_i$ of a secretly shared value $[r]$ shared through Shamir's secret sharing, which becomes a random number r when restored; and calculate a share $[b]_i$ of a secretly shared value [b] shared through Shamir's secret sharing, which becomes a value b when restored by subtracting the share $[r]_i$ from the share $[a]_i$, the share recovery apparatus $\tau_k$ includes:

second circuitry configured to:

generate a share $[r]_k$ of the secretly shared value [r] shared through Shamir's secret sharing;

receive shares $[b]_0, \ldots, [b]_{k-1}$ of the secretly shared value [b] shared through Shamir's secret sharing from the share recovery apparatuses $\sigma_0, \ldots, \sigma_{k-1}$;

recover shares $[b]_k, \ldots, [b]_{k+m-1}$ of the secretly shared value [b] shared through Shamir's secret sharing by obtaining $[b]_{j'}$ through Lagrange interpolation using the shares $[b]_0, \ldots, [b]_{k-1}$ for j'=k, \ldots, k+m-1; and calculate the share $[a]_k$ by adding the share $[r]_k$ to the share $[b]_k$, and the share recovery apparatus $\tau_j$ includes:

third circuitry configured to:

generate a share $[r]_j$ of the secretly shared value [r] shared through Shamir's secret sharing;

receive a share $[b]_j$ of the secretly shared value [b] shared through Shamir's secret sharing from the share recovery apparatus $\tau_k$; and calculate the share $[a]_j$ by adding the share $[r]_j$ to the share $[b]_j$.

2. The share recovery system according to claim 1, wherein the share recovery apparatuses $p_0, \ldots, p_{n-1}$ further comprise:

fourth circuitry configured to:

generate a random number $s_i$ and make the random number $s_i$ open to the public;

generate a shared random number s which is a sum of the random numbers $s_0, \ldots, s_{n-1}$;

calculate share $[c]_i = \sigma_{i \leq m} s^{i+1} [a]_i$ using the shared random number s and the share $[a]_i$;

generate a share $[r']_i$ of a secretly shared value [r'] shared through Shamir's secret sharing, which becomes a random number r' when restored;

calculate a share $[d]_i$ of a secretly shared value [d] shared through Shamir's secret sharing, which becomes a judgment value d when restored by subtracting the share $[r']_i$ from the share $[c]_i$;

recover n-k shares $[d]'_k, \ldots, [d]'_{n-1}$ from k shares $[d]_0, \ldots, [d]_{k-1}$; and judge whether or not the share $[d]_h$ matches the share $[d]'_h$ for h=k, \ldots, n-1.

3. A share recovery apparatus used in a share recovery system that recovers m invalid shares $[a]_k, \ldots, [a]_{k+m-1}$ using k valid shares $[a]_0, \ldots, [a]_{k-1}$ without updating k valid shares $[a]_0, \ldots, [a]_{k-1}$, in which $n \geq 2k-1$, $m \leq n-k$, including:

circuitry configured to:

generate a share $[r]_k$ of a secretly shared value [r] shared through Shamir's secret sharing, which becomes a random number r when restored;

receive shares $[b]_0, \ldots, [b]_{k-1}$ of a secretly shared value [b] shared through Shamir's secret sharing, which becomes a value b when restored from k share recovery apparatuses $\sigma_0, \ldots, \sigma_{k-1}$;

recover shares $[b]_k, \ldots, [b]_{k+m-1}$ of the secretly shared value [b] shared through Shamir's secret sharing by obtaining $[b]_{j'}$ through Lagrange interpolation using the shares $[b]_0, \ldots, [b]_{k-1}$ for j'=k, \ldots, k+m-1; and calculate a share $[a]_k$ of a secretly shared value [a] shared through Shamir's secret sharing obtained by dividing information a into n pieces through Shamir's secret sharing by adding the share $[r]_k$ to the share $[b]_k$.

4. A share recovery method that recovers m invalid shares $[a]_k, \ldots, [a]_{k+m-1}$ using k valid shares $[a]_0, \ldots, [a]_{k-1}$ without updating k valid shares $[a]_0, \ldots, [a]_{k-1}$ in which $n \geq 2k-1$, $m \leq n-k$, i is an integer equal to or greater than 0 and less than k, j is an integer equal to or greater than k+1 and less than k+m, i' is an integer equal to or greater than 0 and less than n, j' is an integer equal to or greater than k and less than k+m, $[a]_0, \ldots [a]_{n-1}$ are shares obtained by dividing information a into n pieces through Shamir's secret sharing, $\sigma_0, \ldots, \sigma_{k-1}$ are k share recovery apparatuses holding valid shares $[a]_0, \ldots, [a]_{k-1}$, and $\tau_k, \ldots, \tau_{k+m-1}$ are m share recovery apparatuses holding invalid shares $[a]_k, \ldots, [a]_{k+m-1}$, the method including:

generating a share $[r]_{i'}$ of a secretly shared value [r] shared through Shamir's secret sharing, which becomes a random number r when restored by circuitry of n share recovery apparatuses $p_{i'}$;

calculating a share $[b]_i$ of a secretly shared value [b] shared through Shamir's secret sharing, which becomes a value b when restored by subtracting the share $[r]_i$ from the share $[a]_i$ by circuitry of k share recovery apparatuses $\sigma_i$;

receiving shares $[b]_0, \ldots, [b]_{k-1}$ of the secretly shared value [b] shared through Shamir's secret sharing from the share recovery apparatuses $\sigma_0, \ldots, \sigma_{k-1}$ by circuitry of the share recovery apparatus $\tau_k$;

recovering shares $[b]_k, \ldots, [b]_{k+m-1}$ of the secretly shared value [b] shared through Shamir's secret sharing by obtaining $[b]_{j'}$ through Lagshare interpolation using the shares $[b]_0, \ldots, [b]_{k-1}$ for j'=k, \ldots, k+m-1 by circuitry of the share recovery apparatus $\tau_k$;

receiving the share $[b]_j$ from the share recovery apparatus $\tau_k$ by circuitry of m-1 share recovery apparatuses $\tau_j$; and calculating the share $[a]_{j'}$ by adding the share $[r]_{j'}$ to the share $[b]_{j'}$ by circuitry of m share recovery apparatuses $\tau_{j'}$.

5. A non-transitory computer readable medium including computer executable instructions that make a share recovery apparatus perform a method that recovers m invalid shares $[a]_k, \ldots, [a]_{k+m-1}$ using k valid shares $[a]_0, \ldots, [a]_{k-1}$ without updating k valid shares $[a]_0, \ldots, [a]_{k-1}$, in which $n \geq 2k-1$, $m \leq n-k$, including:

generating a share $[r]_k$ of a secretly shared value [r] shared through Shamir's secret sharing, which becomes a random number r when restored;

receiving shares $[b]_0, \ldots, [b]_{k-1}$ of a secretly shared value [b] shared through Shamir's secret sharing, which becomes a value b when restored from k share recovery apparatuses $\sigma_0, \ldots, \sigma_{k-1}$;

recovering shares $[b]_k, \ldots, [b]_{k+m-1}$ of the secretly shared value [b] shared through Shamir's secret sharing by obtaining $[b]_{j'}$ through Lagrange interpolation using the shares $[b]_0, \ldots, [b]_{k-1}$ for j'=k, . . . , k+m−1; and calculating a share $[a]_k$ of a secretly shared value [a] shared through Shamir's secret sharing obtained by dividing information a into n pieces through Shamir's secret sharing by adding the share $[r]_k$ to the share $[b]_k$.

\* \* \* \* \*